(12) United States Patent
Morita (10) Patent No.: US 10,302,060 B2
(45) Date of Patent: May 28, 2019

(54) ELECTRIC POWER CONTROL APPARATUS

(71) Applicant: DENSO CORPORATION, Kariya, Aichi-pref. (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 15/000,707

(22) Filed: Jan. 19, 2016

(65) Prior Publication Data

US 2016/0208762 A1 Jul. 21, 2016

(30) Foreign Application Priority Data

Jan. 19, 2015 (JP) ................................. 2015-007530

(51) Int. Cl.
*F02N 11/08* (2006.01)
*F02N 11/14* (2006.01)
*F02N 11/00* (2006.01)
*F02N 11/04* (2006.01)

(52) U.S. Cl.
CPC ............ *F02N 11/14* (2013.01); *F02N 11/006* (2013.01); *F02N 11/0862* (2013.01); *F02N 11/04* (2013.01); *F02N 11/0818* (2013.01); *F02N 2011/0896* (2013.01); *F02N 2200/022* (2013.01); *F02N 2200/063* (2013.01); *F02N 2200/0814* (2013.01)

(58) Field of Classification Search
CPC .... F02N 11/14; F02N 11/006; F02N 11/0862; F02N 11/04; F02N 11/0818; F02N 2011/0896; F02N 2200/022; F02N 2200/063; F02N 2200/0814
See application file for complete search history.

(56) References Cited

U.S. PATENT DOCUMENTS

| 6,323,608 | B1 * | 11/2001 | Ozawa | B60K 6/28 318/139 |
| 6,555,927 | B1 * | 4/2003 | Suzuki | B60K 6/365 290/34 |
| 2001/0052760 | A1 * | 12/2001 | Amano | B60K 6/485 320/163 |

(Continued)

FOREIGN PATENT DOCUMENTS

| JP | 2001-107768 A | 4/2001 | |
| JP | 2001107768 | * 4/2001 | ............ F02D 29/02 |
| JP | 2016-022772 A | 2/2016 | |

*Primary Examiner* — Julio C. Gonzalez
*Assistant Examiner* — Joseph Ortega
(74) *Attorney, Agent, or Firm* — Oliff PLC (57) ABSTRACT

An electric power control apparatus for a vehicle includes a first determination section determining an activation of a jump start, a second determination section determining a connection of an external power source having a higher voltage than a battery voltage of the vehicle, a third determination section determining whether the engine switches to an engine start completed state, a keep section keeping an electric power generation unit of the vehicle in an electric power generation deactivated state when determining that the engine switches to the engine start completed state, a fourth determination section determining a disconnection of the external power source, and an instruction section instructing an immediate activation of the electric power generation to the electric power generation unit when determining the disconnection of the external power source.

4 Claims, 4 Drawing Sheets

(56) References Cited

U.S. PATENT DOCUMENTS

| | | | | |
|---|---|---|---|---|
| 2002/0041174 A1* | 4/2002 | Purkey | F02N 11/14 | 320/103 |
| 2005/0218902 A1* | 10/2005 | Restaino | G01R 19/16542 | 324/433 |
| 2008/0157593 A1* | 7/2008 | Bax | B60L 11/123 | 307/10.1 |
| 2009/0090574 A1* | 4/2009 | Kuno | B60W 20/15 | 180/65.265 |
| 2009/0115251 A1* | 5/2009 | Nakamura | B60K 6/365 | 307/32 |
| 2009/0240387 A1* | 9/2009 | Kawai | B60K 6/445 | 701/22 |
| 2010/0133025 A1* | 6/2010 | Flett | B60K 6/46 | 180/65.22 |
| 2010/0181959 A1* | 7/2010 | Gibbs | F02N 11/0866 | 320/104 |
| 2012/0071298 A1* | 3/2012 | Morita | F02N 11/0822 | 477/167 |
| 2012/0077640 A1* | 3/2012 | Saito | F02D 17/02 | 477/183 |
| 2012/0080001 A1* | 4/2012 | Saito | F02N 11/0822 | 123/179.4 |
| 2012/0083389 A1* | 4/2012 | Morita | B60W 10/02 | 477/185 |
| 2013/0195208 A1* | 8/2013 | Umehara | H04B 3/542 | 375/257 |
| 2013/0234504 A1* | 9/2013 | Morita | H01M 10/425 | 307/9.1 |
| 2013/0238225 A1* | 9/2013 | Morita | F02N 11/0818 | 701/112 |
| 2013/0314024 A1* | 11/2013 | Proebstle | F02N 11/0866 | 320/105 |
| 2014/0002256 A1* | 1/2014 | Hoshiba | B60K 6/445 | 340/441 |
| 2014/0138960 A1* | 5/2014 | Huang | F02N 11/14 | 290/38 R |
| 2016/0017939 A1 | 1/2016 | Maeda | | |
| 2016/0107635 A1* | 4/2016 | Kodawara | B60K 6/48 | 701/22 |

* cited by examiner

ELECTRIC POWER CONTROL APPARATUS

CROSS REFERENCE TO RELATED APPLICATION

This application is based on Japanese Patent Application No. 2015-007530 filed on Jan. 19, 2015, the disclosure of which is incorporated herein by reference.

TECHNICAL FIELD

The present disclosure relates to an electric power control apparatus that controls an electric power generation operation of a vehicle electric power generation device during an engine start of a vehicle.

BACKGROUND

Performances of vehicle batteries deteriorate over time. Thus, in some cases, a jump start needs to be carried out for starting the vehicle with deteriorated battery by temporarily connecting the deteriorated battery with an external power source. In this case, for starting the engine, a power supply to a starter is supplemented by a power source, such as a battery of another vehicle.

For example, as disclosed in JP 2001-107768 A, by connecting the battery of another vehicle with the battery of the subject vehicle using a booster cable, the electric power from the battery of another vehicle can be supplied to the starter of the subject vehicle for starting the engine.

When carrying out a jump start to the subject vehicle, a high voltage external power source, such as a battery voltage of 24 volts, which is usually used in a truck, may be connected to the subject vehicle. Suppose that the 24 volt battery voltage is still supplied to the subject vehicle after the engine start. In this case, when the electric power generation device of the subject vehicle starts an electric power generation operation, an abnormal current may flow through the electric power generation device and the abnormal current may cause damages to the electric power generation device. Suppose that the 24 volt battery voltage is removed from the subject vehicle after the engine start and the electric power generation operation of the electric power generation device is in a deactivated state at a removal time of the 24 volt battery voltage. In this case, since the external power source is removed from the battery, the battery voltage output may be decreased and an engine stall may occur caused by the voltage decrease at the battery terminals.

SUMMARY

In view of the foregoing difficulties, it is an object of the present disclosure to provide an electric power control apparatus that can properly start an engine of a vehicle when a jump start is carried out to the engine with an external power source supplying a voltage higher than a voltage of a battery equipped to the vehicle.

According to an aspect of the present disclosure, an electric power control apparatus for a vehicle includes a first determination section, a second determination section, a third determination section, a keep section, a fourth determination section, and an instruction section. The vehicle includes an engine, an electric power generation unit rotating with a driving power supplied from the engine for generating an electric power, a battery charged by the electric power generated by the electric power generation unit, and a voltage detection unit detecting a battery voltage outputted from the battery. The first determination section determines an activation of a jump start of the engine with an external power source. The second determination section determines whether the external power source, which supplies a voltage higher than the battery voltage, is connected to the battery. The third determination section determines whether the engine switches to an engine start completed state after the jump start of the engine under a condition that the activation of the jump start is determined by the first determination section and a connection of the external power source is determined by the second determination section. The keep section keeps the electric power generation unit in an electric power generation deactivated state when the third determination section determines that the engine switches to the engine start completed state. The fourth determination section determines whether the external power source is disconnected from the battery, based on a battery voltage detection signal acquired from the voltage detection unit, after the third determination section determines that the engine has switched to the engine start completed state. The instruction section instructs an immediate start of an electric power generation to the electric power generation unit when the external power source is determined to be disconnected from the battery by the fourth determination section.

With the above electric power control apparatus, an engine of a vehicle can be properly started when a jump start is carried out to the engine with an external power source having a voltage higher than a voltage of a battery equipped to the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
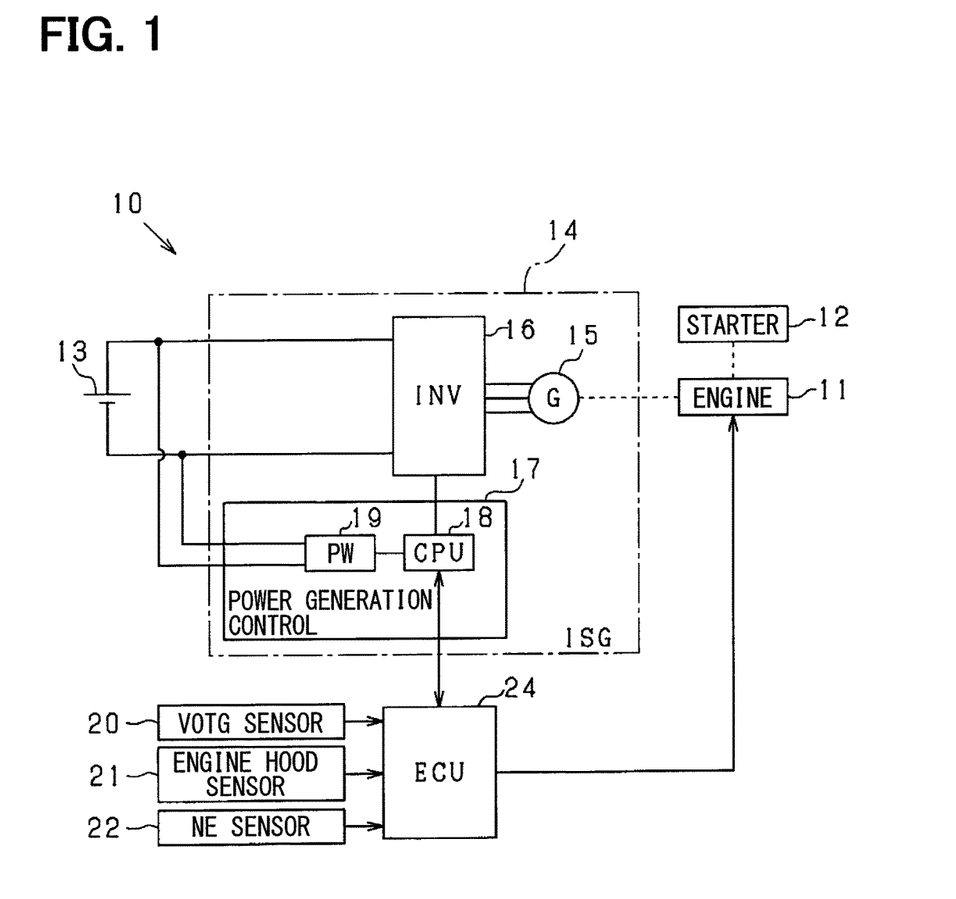
FIG. 1 is a diagram showing a configuration of a vehicle power system according to the present disclosure.

The following will describe an embodiment of the present disclosure with reference to the accompanying drawings. An electric power control apparatus according to the present embodiment is applied in a vehicle power system of a vehicle. Herein, the vehicle includes an engine as a driving source. FIG. 1 shows a configuration of the vehicle power system according to the present embodiment.

As shown in FIG. 1, a vehicle 10 includes an engine 11, a starter 12, a battery 13, and an integrated starter generator (ISG) 14. The engine 11 is an internal combustion engine driven by driving power generated by combustion of fuel, such as gasoline or diesel fuel. As well known, the engine 11 includes a fuel injection valve, an ignition device, and the like. The starter 12 is connected to the battery 13, and is driven by a power supply from the battery 13. The starter 12 powers initial rotation (cranking rotation) of the engine 11 during the engine start process using the electric power supplied from the battery 13. In the present embodiment, the battery 13 used in the vehicle is a lead battery, and has a rated direct current (DC) voltage of 12 volts.

The ISG 14 includes an electric power generator (G) 15, an electric power converter 16, and an electric power generation control unit (POWER GENERATION CONTROL) 17. The electric power generator 15 and the electric power converter 16 together may be referred to as an electric power generation unit, and the electric power converter 16 may include an inverter (INV). The electric power generator 15 is an alternating current (AC) power generator. A rotation axis of the electric power generator 15 is coupled to an output axis of the engine 11 by a belt in a mutual driving manner. Under this configuration, the rotation axis of the electric power generator 15 rotates in response to a rotation of the output axis of the engine 11, and the output axis of the engine 11 rotates in response to a rotation of the rotation axis of the electric power generator 15. That is, the electric power generator 15 can generate electric power using the rotation of the output axis of the engine 11, and can supply motive power to the engine by applying rotation force to the output axis of the engine 11. In the present embodiment, the vehicle 10 has a start-stop system for restricting an idling state of the engine. Thus, when the engine is restarted after an automatic switch-off of the engine 10, the electric power generator 15 supplies the initial rotation (cranking rotation) to the engine 11. Further, the battery 13 is charged by the electric power generated by the electric power generator 15.

Figure 4:
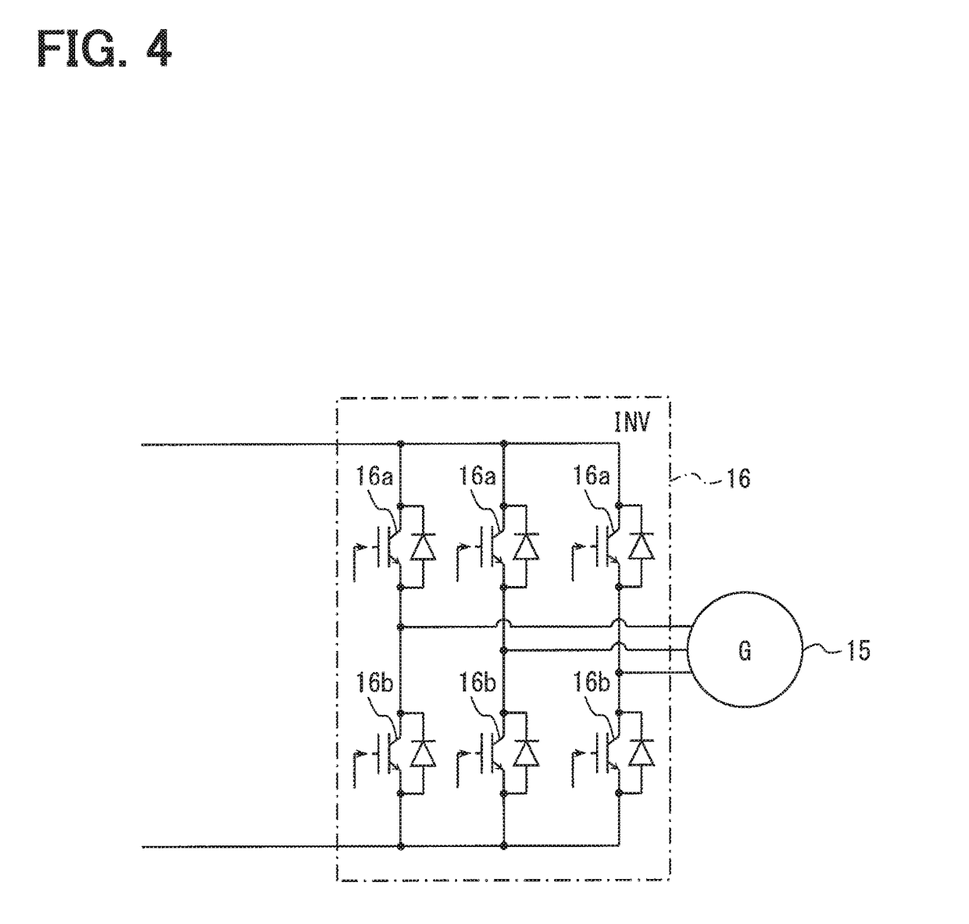
FIG. 4 is a diagram showing an electric power converter in the vehicle power system.

The electric power generator 15 includes a three-phase alternating current (AC) rotator, and is connected to the battery 13 via the electric power converter 16. The electric power converter 16 includes a three-phase bridge corresponding to the three-phase AC rotator. For each phase, the electric power converter 16 has an upper arm switching element 16a and a lower arm switching element 16b. The upper arm switching element 16a is connected in series with the corresponding lower arm switching element 16b. The switching elements 16a, 16b included in the electric power converter 16 may be provided by voltage controlled semiconductor switching elements. For example, the switching elements 16a, 16b may be provided by MOS-FETs.

The electric power generation control unit 17 includes a central processing unit (CPU) 18 and a power source unit (PW) 19. In the present embodiment, the central processing unit 18 functions as the electric power control apparatus. The electric power generation control unit 17 operates with power supply from the battery 13, which is connected with the power source unit 19. The power source unit 19 is provided by a power source circuit which converts the terminal voltage of the battery 13 to an operation voltage of the CPU 18. For example, the operation voltage of the CPU 18 may be set as 5 volt. The power source circuit has a voltage detection function and is able to detect the battery voltage outputted from the battery 13. Thus, the power source unit 19 is also referred to as a voltage detection unit. When the electric power generator 15 generates electric power or outputs the motive power to the engine 11, the CPU 18 controls turning on and turning off of the switching elements 16a, 16b of the electric power converter 16 to perform an electric power conversion between AC power and DC power.

In a case where a jump start of the engine 11 is carried out caused by the deterioration of the battery 13, the CPU 18 performs a process to determine whether the power source used in the jump start is a high voltage power source. In the present embodiment, the high voltage indicates a voltage higher than the battery voltage of the subject vehicle. Further, when the jump start is carried out using the high voltage power source, the CPU 18 performs a process to restrict an electric power generation operation of the electric power generator 15. The following will describe details of the control process executed by the CPU 18.

The vehicle power system of the subject vehicle includes a voltage sensor (VOTG SENSOR) 20, an engine hood sensor 21, a rotation speed sensor (NE SENSOR) 22 and the like. The voltage sensor 20 detects a terminal voltage of the battery 13. The terminal voltage is an output voltage of the battery 13 from the terminal. The engine hood sensor 21 detects an open state or closed state of an engine hood of the subject vehicle. The rotation speed sensor 22 detects a rotation speed of the engine 11. The voltage sensor 20, the engine hood sensor 21, and the rotation speed sensor 22 are connected to an electronic control unit (ECU) 24, and signals from theses sensors 20, 21, 22 are inputted to the ECU 24.

The ECU 24 is provided by a microcomputer including a central processing unit (CPU) and memories. Herein, memories include a read only memory (ROM), a random access memory (RAM) and the like. The CPU of the ECU 24 executes multiple programs stored in the ROM to provide various kinds of functions. The ECU 24 starts operation in response to a turning on of the ignition key by an operation of a driver. The ECU 24 operates with power supplied from the battery 13. The ECU 24 controls fuel injection amount and ignition timing based on each engine operation request and engine operation state. The ECU 24 is communicably connected with the CPU 18 of the electric power generation control unit 17 by a communication wire, and is capable of performing mutual communication with the CPU 18 of the electric power generation control unit 17.

The ECU 24 controls the operation of the CPU 18 of the electric power generation control unit 17. That is, the ECU 24 functions as a superior control unit of the CPU 18 of the electric power generation control unit 17. For example, the ECU 24 monitors a charging state of the battery 13 based on the detection value of the voltage sensor 20, and outputs a control signal to the CPU 18 corresponding to the monitoring result of the charging state of the battery 13. The control signal is used for controlling, that is, activating or deactivating the electric power generation operation of the electric power generator 15 and controlling a switching operation of the switching elements 16a, 16b of the electric power converter 16. When receiving the control signal from the ECU 24, the CPU 18 controls the switching elements 16a, 16b of the electric power converter 16 to perform the electric power conversion between AC power and DC power, and thereby controlling the electric power generation operation of the electric power generator 15.

The following will describe a jump start related process executed by the CPU 18. The CPU 18 includes a first determination section, a second determination section, a third determination section, a keep section, a fourth determination section, and an instruction section. The first determination section determines an activation of a jump start of the engine 11. That is, the first determination section determines a jump start time at which the engine 11 is jump started using the external power source. The second determination section determines whether a high battery voltage, which is higher than the battery voltage of the battery 13 of the subject vehicle, is connected, as the external power source, to the battery 13 of the subject vehicle. Herein, as an example, the high battery voltage is provided by 24 volt battery voltage, which is usually used in a truck. The third determination section determines whether the engine 11 switches to an engine start completed state after the start operation under a condition that the present time is determined to be the jump start time and the 24 volt battery voltage is determined to be connected to the subject vehicle. The keep section keeps an electric power generation deactivated state of the electric power generator 15 when the engine 11 is determined to be switched to the engine start completed state. The fourth determination section determines whether the supply of the 24 volt battery voltage is removed after the engine 11 is determined to be switched to the engine start completed state. The instruction section instructs an immediate start of the electric power generation of the electric power generator 15 when the 24 volt battery voltage is determined to be removed or disconnected from the subject vehicle.

Figure 2:
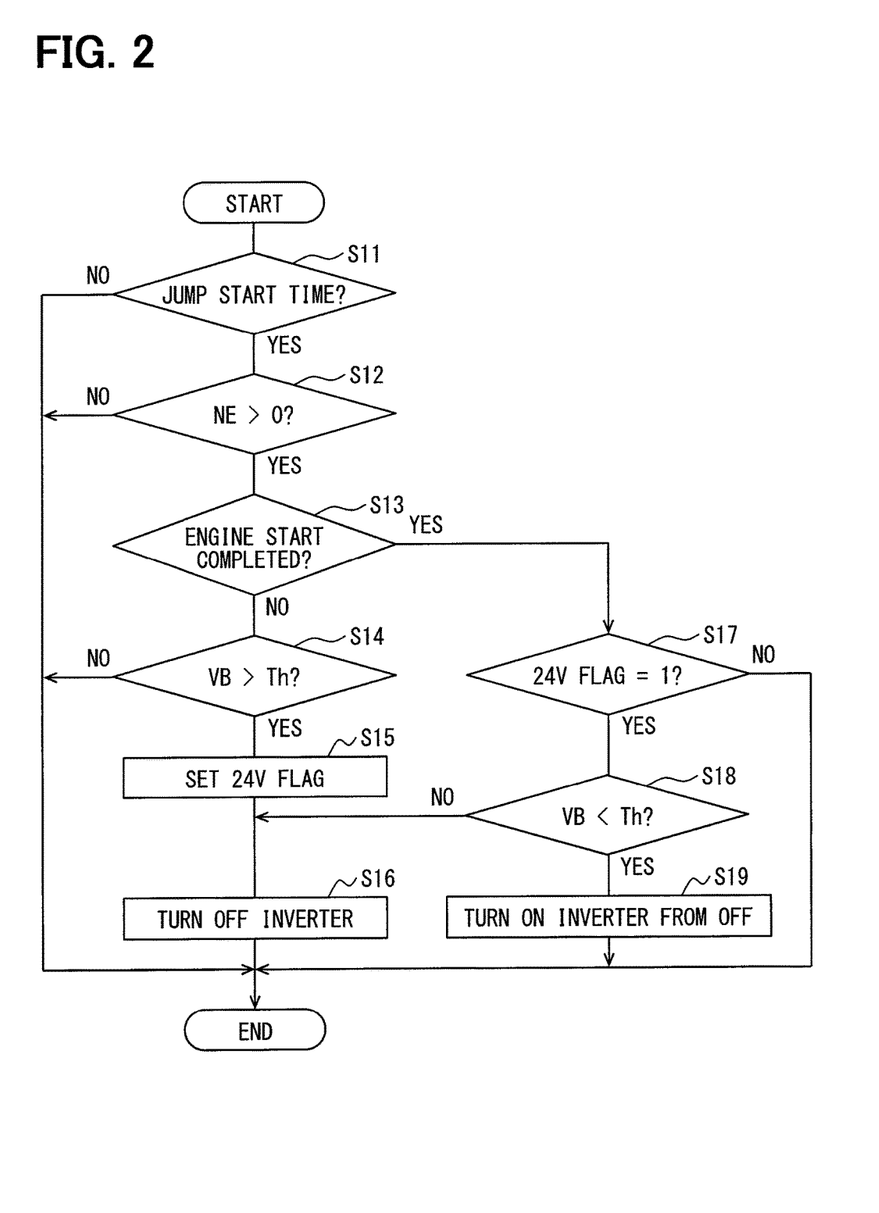
FIG. 2 is a flowchart showing a control process related to an electric power generation operation.

The following will describe the electric power generation control process with reference to FIG. 2. The CPU 18 repeatedly executes the electric power generation control process at predetermined intervals.

At S11, the CPU 18 determines whether the jump start is carried out. In the present embodiment, when determining the open state of the engine hood based on the detection result of the engine hood sensor 21, the CPU 18 determines that the jump start is carried out to the engine of the subject vehicle, that is determines the jump start time. It is considered that the open state of the engine hood is caused by the connection of the booster cable to the battery 13 for supplying external power source to the battery of the subject vehicle. Thus, in the present embodiment, the open state of the engine hood is used to determine the jump start activation. The jump start may be determined using other signals or vehicle states except the open state of the engine hood. For example, a symptom of the deterioration of the battery 13, for example, voltage decrease of the battery 13 detected in a previous travelling may be considered when determining the jump start activation. In a configuration where the vehicle 10 has a jump start switch, the jump start activation may be determined based on a turning on of the jump start switch. The process executed at S11 corresponds to the first determination section. When determining that the present time is not the jump start time at S11, that is, detecting no activation of the jump start, the CPU 18 ends the present process. When determining that the present time is the jump start time at S11, that is, detecting the activation of the jump start, the CPU 18 proceeds to S12.

At S12, the CPU 18 determines whether the engine has been started by determining whether the engine rotation speed is higher than zero based on a NE signal. The NE signal is a signal output from the NE sensor and indicates the rotation speed of the engine 11. When determining that the engine rotation speed is not higher than zero at S12, the CPU 18 ends the present process. When determining that the engine rotation speed is higher than zero at S12, the CPU 18 proceeds to S13.

At S13, the CPU 18 determines whether the engine switches to the engine start completed state after the jump start of engine is carried out with the external power source. The CPU 18 determines whether the engine rotation speed, which is detected by the rotation speed sensor 22, becomes to a predetermined perfect explosion determination level to determine whether the engine switches to the engine start completed state. At S13, when determining that the engine has not switched to the engine start completed state, the CPU 18 proceeds to S14. When determining that the engine has switched to the engine start completed state, the CPU 18 proceeds to S17.

At S14, the CPU 18 determines whether the battery voltage value VB detected by the power source unit 19 is higher than a threshold value Th. The determination at S14 is carried out to determine a connection of 24 volt battery voltage as the external power source. Thus, the threshold value Th may be set to 18 volt as an example. The voltage determination at S14 may also be carried out using the detection value of the voltage sensor 20. In this case, the detection value of the voltage sensor 20 is transmitted from the ECU 24. The process executed at S14 corresponds to the second determination section. When 12 volt battery voltage is connected to the subject vehicle as the external power source, the determination result at S14 is NO, and the CPU 18 ends the present process. When 24 volt battery voltage is connected to the subject vehicle as the external power source, the determination result at S14 is YES, and the CPU 18 proceeds to S15.

At S15, the CPU 18 sets a 24 volt start flag as one. The 24 volt start flag is a flag which indicates a jump start using a voltage of 24 volts or a jump start using a different voltage except 24 volt. When the 24 volt start flag is set to zero, it indicates the jump start is carried out using a different battery voltage other than 24 volt. When the 24 volt start flag is set to one, it indicates the jump start is carried out using a battery voltage of 24 volt.

At S16, the CPU 18 turns off all of the switching elements 16*a*, 16*b* of the electric power converter 16. When all of the switching elements 16*a*, 16*b* of the electric power converter 16 are turned off, the electric power generation operation of the electric power generator 15 is kept in a deactivated state. Then, the CPU 18 ends the process shown in FIG. 2.

At S13, when determining that the engine has switched to the engine start completed state, the CPU 18 proceeds to S17. At S17, the CPU 18 determines whether the 24 volt start flag is equal to one. The determination at S17 is carried out to determine a switch to the engine start completed state after the start of the engine 11 under a condition that the determination of the jump start activation and the determination of the 24 volt battery voltage connection are made by the CPU 18. The process executed at S13 and S17 corresponds to a third determination section. When the determination result is NO at S17, the CPU 18 ends the present process. When the determination result is YES at S17, the CPU 18 proceeds to S18.

At S18, the CPU 18 determines whether the battery voltage VB detected by the power source unit 19 becomes lower than the threshold value Th. The CPU 18 determines a disconnection or a removal of the 24 volt battery voltage from the battery 13 based on the determination made at S18. The process executed at S18 corresponds to a fourth determination section. At this time, YES determination at S17 indicates the connection state of the 24 volt battery voltage, and when the determination at S18 becomes NO, the CPU 18 proceeds to S16. At S16, the CPU 18 keeps the electric power generator 15 in an electric power generation deactivated state as described above. Thus, the process executed at S16 corresponds to a keep section. At S16, even though a control signal, which is outputted from the ECU 24 for activating the electric power generation operation, is inputted to the electric power generator 15, the CPU 18 keeps the electric power generator 15 in the electric power generation deactivated state regardless of the control signal for activating the electric power generation operation from the ECU 24.

When the connection of 24 volt battery voltage is removed or disconnected from the subject vehicle and the determination result at S18 becomes YES, the CPU 18 proceeds to S19. At S19, the CPU 18 starts the electric power generation operation of the electric power generator 15 activating the switching operation of the electric power converter 16. Specifically, the electric power converter 16 turns on the switching elements 16a, 16b for performing the switching operation. The process executed at S19 corresponds to an instruction section.

Figure 3:
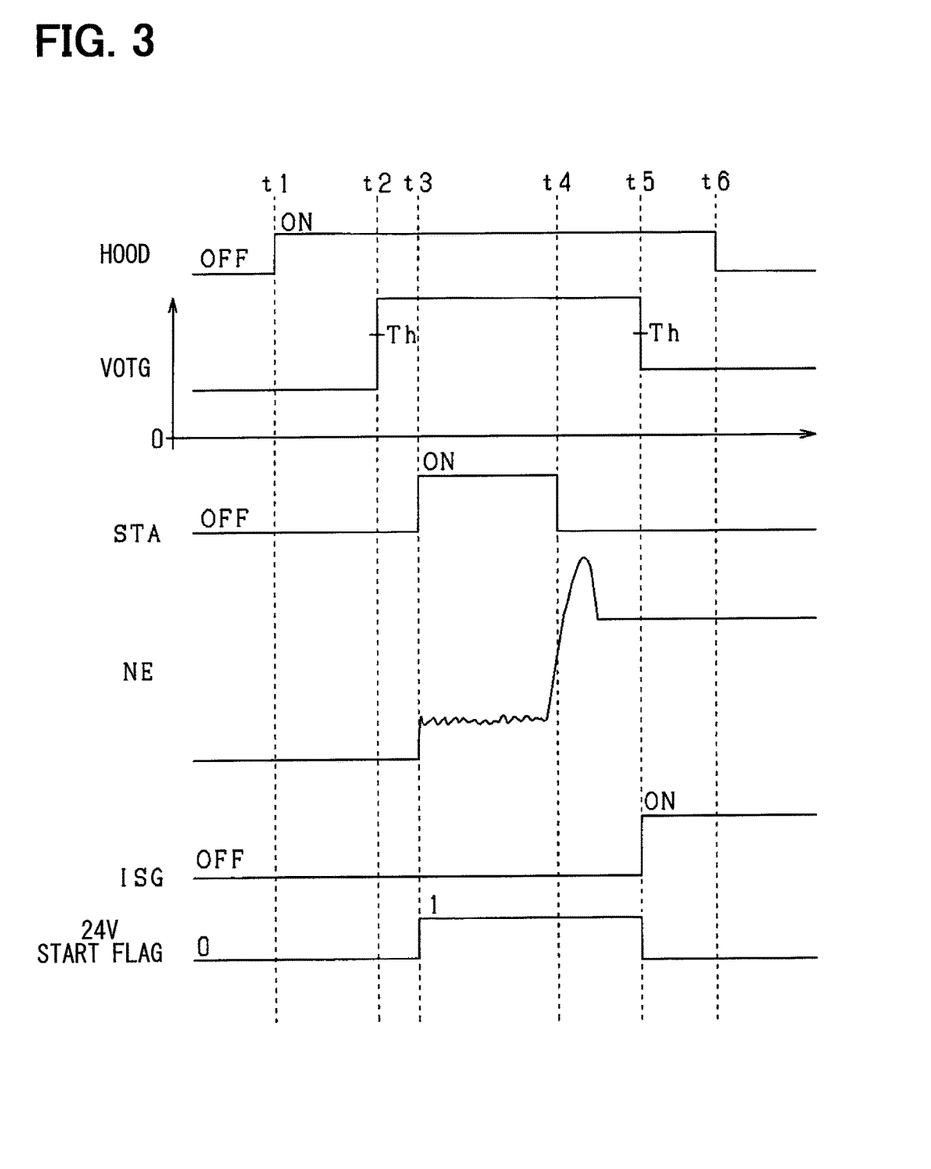
FIG. 3 is a diagram showing signal changes during the electric power generation control process.

The following will describe the electric power generation control process with reference to the signal time chart shown in FIG. 3.

At time t1, the engine hood is set to the open state. That is, the signal indicating a state of the engine hood switches from OFF to ON. At time t2, the 24 volt battery voltage is connected to the battery 13 using the booster cable and the terminal voltage (VOTG) of the battery 13 increases higher than the threshold value Th. At time t3, the starter (STA) 12 is driven by the voltage supplied by 24 volt battery voltage and turns from OFF to ON. When activated at time t3, the starter 12 powers the engine 11 to rotate and the rotation speed (NE) of the engine 11 is increased. At this time, a discharging current flows through the battery 13 by the driving operation of the starter 12. Further, at time t3, the CPU 18 of the electric power generation control unit 17 determines the jump start time and connection of the 24 volt battery voltage, and sets the 24 volt start flag (24V START FLAG) from zero to one.

At time t4, engine start completed state of the engine 11 is determined by based on the engine rotation speed (NE), which increases to the perfect explosion determination value. At time t4, even when the engine 11 switches to the engine start completed state, the electric power generator 15 keeps the electric power generation deactivated state as shown by OFF state of ISG. That is, the electric power generator 15 is in a standby state of the electric power generation operation. Thus, abnormal current which is caused by the electric power generation operation with the 24 volt voltage being applied to the ISG 14 can be restricted.

At time t5, the booster cable is removed from the battery 13 and the disconnection of the 24 volt battery voltage is determined. At this time, the terminal voltage (VOTG) of the battery 13 decreases to a level lower than the threshold value Th. In response to this voltage decrease, the electric power generation operation of the electric power generator 15 is started immediately as shown by OFF to ON of ISG. At time t5, the detected battery voltage is directly inputted to the power source unit 19 of the electric power generation control unit 17 without through the ECU 24, and the detected battery voltage is acquired by the CPU 18 from the power source unit 19. Compared with a case in which the voltage information is inputted from the ECU 24, the voltage decrease can be immediately determined and the electric power generator 15 can promptly start the electric power generation operation in response to the decrease of battery voltage. Thus, the decrease of battery voltage after the disconnection of the 24 volt battery voltage can be effectively restricted. Further, at time t5, the 24 volt start flag is set to zero. At time t6, the engine hood is set to the closed state.

The following will describe advantages provided by the present embodiment.

When performing the jump start using external power source of 24 volt battery, the electric power generation operation of the electric power generator 15 is kept in the deactivated state until the engine 11 switches to the engine start completed state. Thus, generation of abnormal current and the damage to the ISG 14 by the abnormal current can be restricted. After the engine start is completed, the disconnection of the 24 volt battery voltage is determined based on the voltage signal directly acquired from the power source unit 19. Thus, the voltage decrease can be restricted and engine stall caused by the voltage decrease can be restricted. As a result, the engine can be properly started when the jump start is carried out using a high voltage power source which supplies a voltage higher than the battery voltage of the subject vehicle.

The ISG 14 includes the electric power generator 15, the electric power converter 16, and the electric power generation control unit 17. In this configuration, the electric power converter 16 can switch a state of the ISG between an electric power generation activated state and electric power generation deactivated state. When the electric power converter 16 maintains the switching elements 16a, 16b in the off states, the electric power generation deactivated state (also referred to as a standby state) can be properly kept. When the electric power converter 16 turns on the switching elements 16a, 16b, the electric power generation operation can be properly started.

When performing the jump start using the 24 volt battery voltage, the CPU 18 controls the electric power converter 16 to turn on the switching elements 16a, 16b or to turn off the switching elements 16a, 16b regardless of the control signal transmitted from the ECU 24. That is, when the third determination section S13, S17 determines that the engine has switched to the engine start completed state, the keep section S16 keeps the electric power generator 15 in the electric power generation deactivated state even though the control signal for activating the electric power generation is outputted from the ECU 24. Further, when the fourth determination section S18 determines that the external power source is disconnected from the battery 13, the instruction section S19 instructs the immediate start of the electric power generation to the electric power generator 15 even though the control signal for deactivating the electric power generation is outputted from the ECU 24. With this configuration, the electric power generation state can be properly controlled by the CPU 18.

Usually, the battery 13 equipped to a private passenger vehicle has a voltage of 12 volt, and the battery equipped to a commercial purpose vehicle has a voltage of 24 volt. Thus, when the 24 voltage battery of the commercial purpose vehicle is used to perform the jump start of the private passenger vehicle, the jump start can be properly carried out with the electric power control apparatus according to the present embodiment.

In the above-described configuration, when the jump start of the engine 11 is carried out by the power supply from the high voltage power source, the power generation operation of the electric power generator 15 is kept in a deactivated state. That is, the power generation operation of the electric power generator 15 is kept in a standby state. With this configuration, an abnormal current, which is generated by the electric power generation operation of the electric power generator 15 under the high voltage power source is applied to the electric power generator 15, can be restricted. Further, after the completion of the engine start, when the high voltage power source is determined to be disconnected from the battery 13 of the subject vehicle based on the voltage signal directly detected by the power source unit 19, the power generation operation of the electric power generator 15 is immediately activated. With this configuration, after the disconnection of the high voltage power source, the voltage decrease at the battery terminal can be restricted and engine stall caused by the voltage decrease of the battery 13 can be restricted. As a result, the engine can be properly started when the jump start is carried out using the high voltage power source which supplies a voltage higher than the battery voltage of the subject vehicle.

The following will describe modifications of the present disclosure.

In the foregoing embodiment, a connection of the 24 volt battery voltage is determined as the external power source. In another example, a connection of an external battery, which supplies a voltage higher than the battery voltage of the subject vehicle, may be determined as the external power source. Further, a high voltage power source other than the vehicle battery, for example, a battery for home use may be connected to the subject vehicle for performing the jump start.

The vehicle 10 may include an alternator as the electric power generation device instead of the ISG 14. In this case, a switch may be disposed between the battery 13 and the alternator. In the engine completed state after the jump start using the 24 volt battery voltage, the switch may be turned off (open state) to keep the electric power generation deactivated state.

In the foregoing embodiment, the first determination section determines an activation of the jump start of the engine 11, and the second determination section determines whether a high battery voltage is connected to the battery 13 of the subject vehicle. Usually, when a high battery voltage is connected to the battery 13 of the subject vehicle, it is considered that a jump start is to be carried out. Thus, the first determination may be omitted. In this case, when the high battery voltage is connected to the battery 13 of the subject vehicle, the second determination section determines the connection of the high battery voltage to the battery 13 of the subject vehicle and the activation of the jump start at the same time.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An electric power control apparatus integrally equipped to a vehicle, the vehicle including an engine, an electric power generation unit rotating with a driving power supplied from the engine for generating an electric power, a battery of the vehicle charged by the electric power generated by the electric power generation unit, and a voltage detection unit detecting a battery voltage outputted from the battery of the vehicle, the electric power control apparatus comprising:
   a first determination section determining an activation of a jump start of the engine with an external power source, the external power source being a separate power source from the vehicle and supplying a power to the battery of the vehicle from an outside of the vehicle;
   a second determination section determining whether the external power source, which supplies a voltage higher than the battery voltage, is connected to the battery of the vehicle;
   a third determination section determining whether the engine switches to an engine start completed state after the jump start of the engine under a condition that the activation of the jump start is determined by the first determination section and a connection of the external power source is determined by the second determination section;
   a keep section keeping the electric power generation unit in an electric power generation deactivated state when the third determination section determines that the engine switches to the engine start completed state;
   a fourth determination section determining whether the external power source is disconnected from the battery of the vehicle, based on a battery voltage detection signal acquired from the voltage detection unit, after the third determination section determines that the engine has switched to the engine start completed state; and
   an instruction section instructing an immediate start of an electric power generation to the electric power generation unit when the external power source is determined to be disconnected from the battery of the vehicle by the fourth determination section,
   wherein the second determination section sets a threshold value that is higher than a rated voltage of the battery of the vehicle, and
   wherein when the voltage of the external power source is higher than the threshold value, the second determination section determines that the external power source, which supply the voltage higher than the battery voltage, is connected to the battery of the vehicle.

2. The electric power control apparatus according to claim 1, wherein
   the electric power generation unit includes an alternating current power generator and an electric power converter,
   the battery voltage outputted from the battery of the vehicle is a direct current voltage,
   the electric power converter includes a plurality of switching elements disposed between the battery of the vehicle and the AC power generator,
   the plurality of switching elements included in the electric power converter perform a switching operation to implement an electric power conversion between AC power and DC power,
   the keep section controls the plurality of switching elements in off states for keeping the AC power generator in the electric power generation deactivated state, and
   the instruction section activates the switching operation of the plurality of switching elements in response to a disconnection of the external power source from the battery of the vehicle and instructs the AC power generator to start a generation of the electric power.

3. The electric power control apparatus according to claim 2, wherein
   the vehicle further includes a superior control unit that monitors a charging state of the battery of the vehicle and outputs a control signal for controlling the AC power generator and the electric power converter based on a monitoring result of the charging state of the battery of the vehicle,
   the electric power converter performs the switching operation based on the control signal outputted from the superior control unit,
   when the third determination section determines that the engine has switched to the engine start completed state, the keep section keeps the AC power generator in the electric power generation deactivated state even though the control signal for activating the electric power generation is outputted from the superior control unit, and when the fourth determination section determines that the external power source is disconnected from the battery of the vehicle, the instruction section instructs the immediate start of the electric power generation to the AC power generator even though the control signal for deactivating the electric power generation is outputted from the superior control unit.

4. The electric power control apparatus according to claim 1, wherein the battery of the vehicle has a voltage of 12 volts and the external power source is provided by a different battery having a voltage of 24 volts, and the second determination section determines a connection of the different battery to the battery of the vehicle.

* * * * *